(12) United States Patent
McMahon et al.

(10) Patent No.: US 6,932,544 B2
(45) Date of Patent: Aug. 23, 2005

(54) DUAL INSERTER APPLICATOR

(75) Inventors: Michael McMahon, Palatine, IL (US); Stanley Piotrowski, Addison, IL (US); Donald L. Crevier, Essex, IL (US)

(73) Assignee: Illinois Tool Works Inc., Glenview, IL (US)

( * ) Notice: Subject to any disclaimer, the term of this patent is extended or adjusted under 35 U.S.C. 154(b) by 57 days.

(21) Appl. No.: 10/818,652

(22) Filed: Apr. 6, 2004

(65) Prior Publication Data

US 2004/0191006 A1 Sep. 30, 2004

Related U.S. Application Data

(60) Division of application No. 10/227,028, filed on Aug. 23, 2002, now Pat. No. 6,726,408, which is a continuation-in-part of application No. 10/106,687, filed on Mar. 25, 2002, now Pat. No. 6,666,626, which is a continuation-in-part of application No. 10/096,409, filed on Mar. 11, 2002.

(51) Int. Cl.[7] .............................................. B65G 53/00
(52) U.S. Cl. ............................ 406/197; 406/3; 406/19; 406/156; 406/176
(58) Field of Search ............................... 406/3, 19, 197

(56) References Cited

U.S. PATENT DOCUMENTS

| | | | |
|---|---|---|---|
| 3,172,705 A | 3/1965 | Burke | 406/75 |
| 3,701,191 A | 10/1972 | Laguerre | 29/207.5 |
| 3,701,192 A | 10/1972 | Laguerre | 29/207.5 |
| 3,877,241 A * | 4/1975 | Wade | 62/137 |
| 4,275,976 A | 6/1981 | Sticht | 406/28 |
| 5,217,328 A * | 6/1993 | Lang | 406/1 |
| 5,651,643 A * | 7/1997 | Haul et al. | 406/3 |
| 5,660,506 A * | 8/1997 | Berge et al. | 406/3 |
| 6,210,081 B1 | 4/2001 | Saho et al. | 406/134 |
| 6,309,144 B1 * | 10/2001 | Ingraham | 406/19 |
| 6,317,969 B1 * | 11/2001 | Funaya et al. | 29/766 |
| 6,468,005 B1 | 10/2002 | Esper | 406/31 |
| 6,796,931 B2 * | 9/2004 | Cortigiano, Sr. | 493/213 |

* cited by examiner

Primary Examiner—Joe Dillon, Jr.
(74) Attorney, Agent, or Firm—Pitney Hardin LLP

(57) ABSTRACT

An apparatus (10) for feeding sliders (31) from a source of sliders to the slider insertion area (27) of at least two slider insertion devices (18, 19). A sensor (30, 52) on a sender track (20, 21) detects a lack of sliders (31) in the sender track. A signal is sent from the sensor (30, 52) to actuate a vibratory bowl (14) of sliders (31) and a plunger (35) to open a passage, thereby releasing the sliders (31) to a sender track (20, 21). When a sensor (46, 56) detects a lack of sliders (31) in a loading rack (25, 26) or a slider insertion area (27), the sensor (46, 56) signals a plunger (44, 58) and a pneumatic valve (48, 60) to open a passage to provide an air blast, thereby launching the sliders (31) onto the slider insertion area (27) of each slider insertion device (18, 19). A directional gate (33) sends the sliders (31) to either sender track (20, 21) prior to launching to either slider insertion device (18, 19), or a directional gate (79) sends the sliders (31) to either slider insertion device (18, 19) after launching of the sliders (31).

5 Claims, 6 Drawing Sheets

DUAL INSERTER APPLICATOR

RELATED APPLICATIONS

This application is a division of application Ser. No. 10/227,028, filed Aug. 23, 2002 now U.S. Pat. No. 6,726,408, which is a continuation-in-part of application Ser. No. 10/106,687, filed Mar. 25, 2002 now U.S. Pat. No. 6,666,626, entitled "SYSTEM FOR TRANSPORTING SLIDERS FOR ZIPPER BAGS", which is a continuation-in-part of application Ser. No. 10/096,409, filed Mar. 11, 2002, entitled "INSERTION APPARATUS FOR ATTACHING SLIDERS ONTO ZIPPER BAGS AND FILM".

BACKGROUND OF THE INVENTION

1. Field of the Invention

The present invention relates to the process of inserting sliders onto slide zippers used on reclosable plastic bags and, more particularly, to an apparatus which pre-positions and feeds a set number of sliders from a slider supply to the slider insertion area of at least two slider insertion devices, with the set number of sliders based on the requirements of each slider insertion device.

2. Description of the Prior Art

Reclosable bags having slide zippers are generally more desirable to consumers than bags having traditional interlocking zippers, since such bags are perceived to be easier to open and close than bags with sliderless zippers. As a result, slide zippers for use with plastic bags are numerous and well-known in the reclosable fastener art. Typical slide zippers comprise a plastic zipper having two interlocking profiles and a slider for engaging and disengaging the interlocking profiles of the zipper.

Methods and apparatuses for manufacturing reclosable plastic bags using reclosable zippers with a slider are also well-known in the art. Known slider loaders include the Hugues reference (U.K. Patent No. 2,085,519) and the LaGuerve references (U.S. Pat. Nos. 3,701,191 and 3,701,192), as well as the slider insertion apparatus provided in application Ser. No. 10/096,409, filed Mar. 11, 2002, entitled "INSERTION APPARATUS FOR ATTACHING SLIDERS ONTO ZIPPER BAGS AND FILM". Typically, a loading rack providing a supply of sliders to a slider insertion area is attached as part of the slider loader or the slider insertion apparatus. As such, the use of loading racks with slider loaders or other insertion devices is fairly well-developed in the prior art, but nevertheless remains open to improvements contributing to increased efficiency and cost-effectiveness.

An improvement in the use of loading racks is to provide a feed tube and sender apparatus in which sliders are pneumatically transported in predetermined quantities from a supply of sliders to the loading rack. The slider feed apparatus of application Ser. No. 10/106,687 entitled "SYSTEM FOR TRANSPORTING SLIDERS FOR ZIPPER BAGS" and filed Mar. 25, 2002, provides an apparatus for transporting a predetermined quantity of sliders to a loading rack and the slider insertion area of a slider insertion device.

A further improvement in the ability of transporting sliders in predetermined quantities to a slider insertion apparatus is the ability to pre-position and feed a predetermined quantity of sliders from one slider supply to a plurality of slider insertion devices. By using one slider supply for a plurality of slider insertion devices, the amount of space and maintenance required for expanded manufacturing operations is reduced.

SUMMARY OF THE INVENTION

Accordingly, the present invention provides a slider feed apparatus for transporting sliders from a supply of sliders to a slider insertion area of one or more slider insertion devices. Generally, the slider feed apparatus includes one or more sender tracks, one or more feed tubes, a plurality of solenoid-operated plungers or blocking members, and a control panel including controllers.

In the slider feeding process of the first embodiment of the present invention, a first sensor on a first sender track detects a lack of sliders on the sender track. A signal is sent from the first sensor to the control panel. The control panel actuates a vibratory bowl and/or a first solenoid-operated plunger to release a quantity of sliders from a supply of sliders in the vibratory bowl to a slider entry port for the sender tracks. An actuated directional gate ensures that the quantity of sliders is released to the first sender track rather than to a second sender track of the apparatus. Once released from the vibratory bowl, directional air connections on the first sender track pneumatically push the sliders to a second solenoid-operated plunger at the slider exit port of the sender track. When the first sensor detects that the first sender track has an adequate quantity of sliders, the first vibratory bowl is turned off and/or the first plunger is closed.

A second sensor is provided to detect a lack of sliders in the loading rack of a first slider insertion device. Upon detecting a lack of sliders, the second sensor signals a second controller of the control panel to actuate the second plunger and a first solenoid-operated pneumatic valve. Upon actuation, the second plunger opens a passage in the first sender track and the first pneumatic valve opens to provide an air blast within the sender track, thereby launching a group of sliders out of the sender track into a first feed tube and onto the loading rack. The first plunger, in a corollary function, prevents the launched sliders from being pushed back into the vibratory bowl by closing the passage back to the vibratory bowl when the first pneumatic valve opens.

As the group of sliders passes to the first loading rack, the loading rack is filled or the quantity of required sliders is met. The second sensor detects that the quantity of sliders in the loading rack is sufficient and signals the second controller to close the first pneumatic valve and the plunger. This slider feeding process repeats itself as sliders are being used during insertion onto zippers used for reclosable bags.

A second sender track is provided to supply sliders to a second slider insertion device. If a third sensor of the apparatus positioned on the second sender track detects a deficiency in the quantity of sliders in the second sender track, the third sensor signals the control panel. The control panel actuates the vibratory bowl to release a quantity of sliders to the slider entry port. The actuated directional gate blocks the released sliders from entering the first sender track, thereby allowing the sliders to enter the second sender track. Once the third sensor detects a predetermined quantity of sliders in the second sender track, the vibratory bowl is shut down. Similar to the operation with the first sender track, the first controller of the control panel also actuates the first plunger to allow movement of the sliders from the vibratory bowl to the second sender track. The quantity of sliders released to the second sender track is pushed along the sender track by directional air connections to a slider exit port of the sender track. Once the sliders are sent to a third solenoid-operated plunger at the slider exit port, the sliders are ready to be launched.

A fourth sensor of the apparatus is connected to the second loading rack to detect a lack of sliders in the loading rack or variations in the quantity of sliders required in the loading rack. When a lack of sliders or a variation in the required quantity of sliders is detected, the fourth sensor signals the second controller to open a third solenoid-operated plunger and a second solenoid-operated pneumatic valve.

Upon actuation, the third plunger opens a passage from the second sender track to the second feed tube. At the same moment, the second pneumatic valve opens to provide an air blast that launches the sliders out of the second sender track into the second feed tube. After passage through the second feed tube, the second loading rack is supplied with a sufficient quantity of sliders. Once a sufficient quantity of sliders is detected in the loading rack, the fourth sensor signals the second controller to close the second pneumatic valve and the third plunger. This process repeats itself as the sliders are being used during insertion onto a zipper for a reclosable bag, with the control panel being able to direct sliders to either loading rack or to multiple loading racks during the operation of the apparatus.

In some circumstances, such as space considerations, loading racks may not be used with the slider insertion devices. The feed tubes of the apparatus can transport a single slider directly to the slider insertion area of each of the slider insertion devices without using loading racks. If a slider is not present in the slider insertion area of a slider insertion device, a sensor signals a controller to open a plunger and a pneumatic valve on the sender track feeding the slider insertion device. The plunger opens a passage from the sender track to a feed tube while the pneumatic valve opens to provide an air blast in the sender track which launches the slider onto and through the feed tube.

After passage through the feed tube, the slider insertion device is supplied with a slider ready for insertion. Once the slider is detected in the slider insertion area, the sensor signals the controller to close the pneumatic valve and the plunger. This process repeats itself for either slider insertion device as the sliders are being used during insertion onto a zipper used for a reclosable bag.

In the slider feeding process of the second embodiment, a first sensor on a sender track detects the quantity of sliders on the sender track. The first sensor signals a control panel to actuate a vibratory bowl. The vibratory bowl releases a quantity of sliders to a slider entry port of the sender track. Once the first sensor detects a predetermined quantity or an adequate quantity of sliders in the sender track, the control panel turns off the vibratory bowl. During the "off" mode of the vibratory bowl, a first solenoid-operated plunger prevents movement of the sliders by blocking passage from the vibratory bowl to the sender track. The quantity of sliders released to the sender track is pushed along the sender track by pressurized air or gas to a second solenoid-operated plunger at a slider exit port of the sender track. Once the sliders are sent to the slider exit port, they are ready to be launched into either a first or a second feed tube.

When a lack of sliders or a variation of the required quantity of sliders is detected by a second sensor, the sensor signals a controller of the control panel to actuate a directional gate, the second plunger and a solenoid-operated pneumatic valve. Upon actuation, the directional gate blocks passage from the slider exit port to the second feed tube, thereby providing passage to the first feed tube. The second plunger then opens a passage from the first sender track. At the same moment, the pneumatic valve opens to provide an air blast in the sender track in order to launch the sliders out of the sender track. The first plunger prevents the launched sliders from being pushed back into the vibratory bowl by closing the passage back to the vibratory bowl when the pneumatic valve is opened.

After passage through the first feed tube, the first loading rack is supplied with a sufficient quantity of sliders. Once a sufficient quantity of sliders is detected in the first loading rack, the second sensor signals the control panel to close the pneumatic valve and the second plunger. The apparatus of the second embodiment can alternatively send a supply of sliders to the second feed tube and the second slider loading rack. This process repeats itself as the sliders are being used during insertion onto a zipper for a reclosable bag, with the controllers of the control panel being able to direct sliders to either loading rack or to other added loading racks during the operating cycle of the apparatus.

For both embodiments, sensors are provided to detect the presence of a slider in the slider insertion area of each of the slider insertion devices. If either of the sensors detects the absence of a slider in the slider insertion area of its respective slider insertion device, the sensor signals a solenoid-operated pneumatic valve to release pressurized air or gas into the loading rack of the respective slider insertion device, thereby moving a slider to the insertion area of the device.

Similar to the first embodiment of the present invention, the feed tubes can transport a single slider directly to the slider insertion area of each slider insertion device without the need for a slider loading rack. If a slider is not present in the slider insertion area of either slider insertion device, a sensor signals a controller to actuate a directional gate, a plunger and a pneumatic valve. Upon actuation, the directional gate provides passage from the sender track of the apparatus to the feed tube for the detected slider insertion device. The plunger then opens a passage from the sender track containing a slider. At the same moment, the pneumatic valve opens to provide an air blast in the sender track which launches the slider out of the sender track to the feed tube.

After passage through the feed tube, the slider insertion device is supplied with a slider ready for insertion. Once the slider is detected in the slider insertion area, the sensor signals the control panel to close the pneumatic valve and the plunger. This slider feeding process can be repeated for either slider insertion device as the sliders are being used during insertion onto a zipper used for a reclosable bag.

BRIEF DESCRIPTION OF THE DRAWINGS

Thus by the present invention its objects and advantages will become readily apparent upon reading the following detailed description taken in conjunction with the accompanying drawings, in which.

DETAILED DESCRIPTION OF THE PREFERRED EMBODIMENTS

Figure 1:
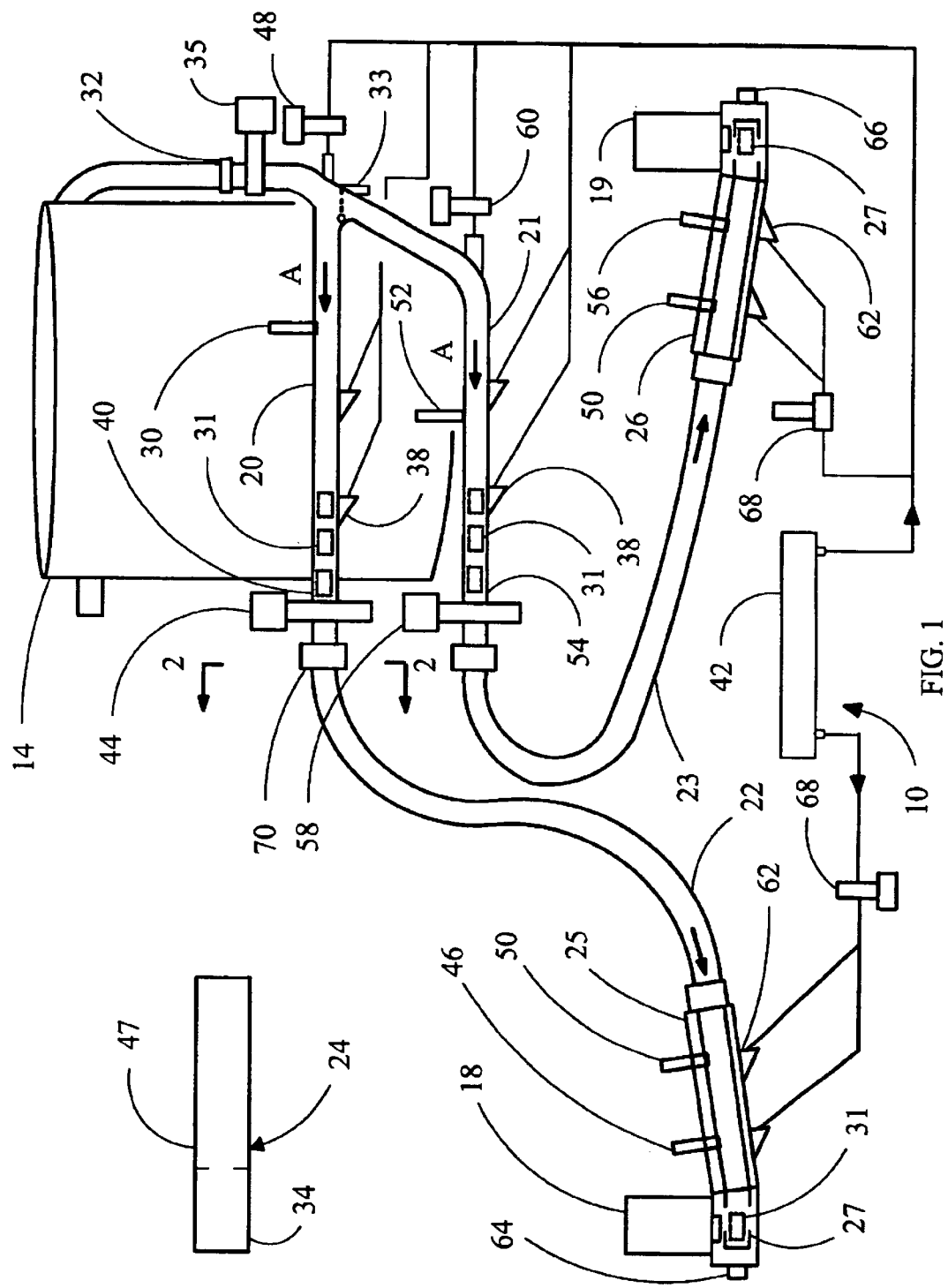
FIG. 1 is an arrangement view of a first embodiment of the present invention with sliders being fed from a supply of sliders to the loading racks of two slider insertion devices.

Referring now to the drawings in detail wherein like numerals indicate like elements throughout the several views, FIG. 1 is an arrangement view depicting the feed tube and sender apparatus 10 in a first embodiment of the present invention. Hereinafter, the feed tube and sender apparatus 10 will be referred to as the apparatus 10.

As shown in FIG. 1, the apparatus 10 provides a conduit for sliders supplied by a vibratory bowl 14 to at least two slider insertion devices 18, 19. The apparatus 10 generally includes first and second elongated sender tracks 20, 21; first and second feed tubes 22, 23; a control panel 24; and optional first and second loading racks 25, 26. The loading racks 25, 26 are optional since the apparatus 10 can be attached to loading racks that are provided with existing slider insertion devices.

In the slider feeding process of the first embodiment, a first sensor 30 on the first sender track 20 detects the quantity of, or a lack of, sliders 31 in the sender track. The first sensor 30 signals the control panel 24. The control panel 24, which may be computer based or an electrical based component, actuates the vibratory bowl 14 to an operating mode. In FIG. 1 and in the figures throughout, the control lines from the components and sensors of the apparatus 10 to the control panel 24 of the apparatus have been removed for illustrative purposes.

When operating, the vibratory bowl 14 releases a quantity of sliders 31 from the vibratory bowl to a slider entry port 32. A directional gate 33, actuated by a first controller 34 of the control panel 24, blocks the sliders 31 from entering the second sender track 21, thereby allowing the sliders to enter the first sender track 20. Once the first sensor 30 detects that the first sender track 20 has a predetermined quantity or an adequate quantity of sliders 31, the vibratory bowl 14 is turned off.

Additionally or alternatively, the first controller 34 actuates a blocking member such as a first solenoid-operated plunger 35. The first plunger 35 allows the movement of the sliders 31 from the vibratory bowl 14. During the "off" mode of the vibratory bowl 14, the first plunger 35 prevents the release of the sliders 31 by blocking passage to the sender tracks 20, 21. The first plunger 35, as well as the other solenoid-operated equipment described below, may be actuated by means other than the control panel 24 with the actuating means known to those skilled in the art.

The quantity of sliders 31 released to the first sender track 20 is pushed along the sender track by directional air connections 38. The directional air connections 38, which are positioned along the elongated portion of the first sender track 20, pneumatically push the sliders to a slider exit port 40 of the sender track. The directional air connections 38 are supplied by pressurized air or gas from a register 42 or by any other pressurized source.

A second blocking member, such as a second solenoid-operated plunger 44, is positioned at the slider exit port 40. Once the sliders 31 are sent to the second plunger 44, they are ready to be launched into the first feed tube 22.

A second sensor 46 connected to the first loading rack 25 detects a lack of sliders 31 in the loading rack or variations in the quantity of sliders required in the loading rack. When a lack of sliders 31 or a variation in the required quantity of sliders is detected, the second sensor 46 signals the control panel 24. A second controller 47 of the control panel 24 actuates the second plunger 44 and a first solenoid-operated pneumatic valve 48.

Upon actuation, the second plunger 44 opens a passage from the first sender track 20 to the first feed tube 22. At the same moment, the first pneumatic valve 48 opens to provide an air blast in the first sender track 20 upstream of the sliders 31. The air blast launches the sliders 31 out of the first sender track 20 in direction "A". The first plunger 35, in a corollary function, prevents the launched sliders 31 from being pushed back into the vibratory bowl 14 by closing the passage back to the vibratory bowl when the first pneumatic valve 48 is opened.

The launched sliders 31 pass from the first sender track 20 to the first feed tube 22. As will be discussed below, the feed tubes 22, 23 are uniquely molded to ensure efficient passage of the sliders 31 without jamming. After passage through the first feed tube 22, the first loading rack 25 is supplied with a sufficient quantity of sliders 31. Once a sufficient quantity of sliders 31 is detected in the first loading rack 25, the second sensor 46 signals the second controller 47 to close the first pneumatic valve 48 and the second plunger 44. This slider feeding process repeats itself as the sliders 31 are being used during insertion onto a zipper for a reclosable bag. A backup sensor 50 is also provided for each loading rack 25, 26 to signal the control panel 24 when more sliders 31 are needed in either loading rack.

The apparatus 10 of the first embodiment can alternatively send a supply of sliders 31 to the second sender track 21 and the second loading rack 26. When a third sensor 52 of the apparatus 10, connected to the sender track 21, detects a deficiency in the quantity of, or a lack of, sliders 31 in the sender track, the sensor signals the control panel 24. The control panel 24 actuates the vibratory bowl 14 to release a quantity of sliders 31 to the slider entry port 32. The directional gate 33 actuated by the first controller 34 blocks the sliders 31 from entering the first sender track 20, thereby allowing the sliders to enter the second sender track 21. Once the third sensor 52 detects that the second sender track 21 has an adequate quantity of sliders, the control panel 24 actuates the vibratory bowl 14 to shut down. Similar to the operation of the first sender track 20, the first controller 34 actuates the first plunger 35 to allow movement of the sliders 31 to the second sender track 21. The quantity of sliders 31 released to the second sender track 21 is pushed along the sender track by the directional air connections 38 to a slider exit port 54 of the second sender track 21. Once the sliders 31 are sent to the slider exit port 54, they are ready to be launched into the second feed tube 23.

A fourth sensor 56 of the apparatus 10, connected to the second loading rack 26, detects a lack of sliders 31 in the loading rack or variations in the quantity of sliders required in the loading rack. When a lack of sliders 31 or a variation in the required quantity of sliders is detected, the fourth sensor 56 signals the controller 47 to actuate a third solenoid-operated plunger 58 and a second solenoid-operated pneumatic valve 60. Upon actuation, the third plunger 58 opens a passage from the second sender track 21 to the second feed tube 23. At the same moment, the second pneumatic valve 60 opens to provide an air blast in the second sender track 21 which launches the sliders 31 out of the sender track in direction "A". The launched sliders 31 pass from the second sender track 21 onto and through the second feed tube 23.

After passage through the second feed tube 23, the second loading rack 26 is supplied with a sufficient quantity of sliders 31. Once a sufficient quantity of sliders 31 is detected, the fourth sensor 56 signals the controller 47 to close the second pneumatic valve 60 and the third plunger 58. The slider feeding process repeats itself as the sliders 31 are being used during insertion onto a zipper for a reclosable bag, with the controllers of control panel 24 being able to direct sliders to either loading rack 25, 26, or to multiple loading racks, during the operating cycle of the apparatus 10.

The optional loading racks 25, 26 further assist in the transport of the sliders 31 to the slider insertion area 27 of the slider insertion devices 18, 19. Similar to the sender tracks 20, 21, the loading racks 25, 26 comprise tracks that maintain the orientation of the sliders 31. Also similar to the sender tracks 20, 21, the sliders 31 are pushed on the loading racks by directional air connections 62, with the air connections supplied by pressurized air or gas from the register 42 or by any other pressurized source.

A fifth sensor 64 of the apparatus 10 is provided to detect the presence of a slider 31 in the slider insertion area 27 of the first slider insertion device 18. A sixth sensor 66 of the apparatus 10 is provided to detect the presence of a slider 31 in the slider insertion area 27 of the second slider insertion device 19. If either of the sensors 64, 66 detects the absence of a slider in the slider insertion area 27 of its respective slider insertion device, the sensor signals a third solenoid-operated pneumatic valve 68 to release air into the loading rack of the slider insertion device, thereby moving a slider in the loading rack to the slider insertion area of the device.

As shown in the figures, the loading racks 25, 26 may slant away from the slider insertion devices 18, 19. A slight slant assists the movement of the sliders 31 in the loading rack, especially if a source of pressurized air or gas is unavailable. The slant of each loading rack 25, 26 is preferably fifteen degrees off an axis perpendicular to the direction of slider insertion. However, other slant angles, as well as a curved loading rack, may be used.

As stated previously, the feed tubes 22, 23 are uniquely molded to ensure efficient passage of the sliders 31. The feed tubes are preferably molded from a resilient material such as polyurethane; however, other moldable materials are known to those skilled in the art. A resilient material prevents the feed tubes from axially twisting or kinking, thereby allowing the feed tubes to be formed as a curved path.

Figure 2:
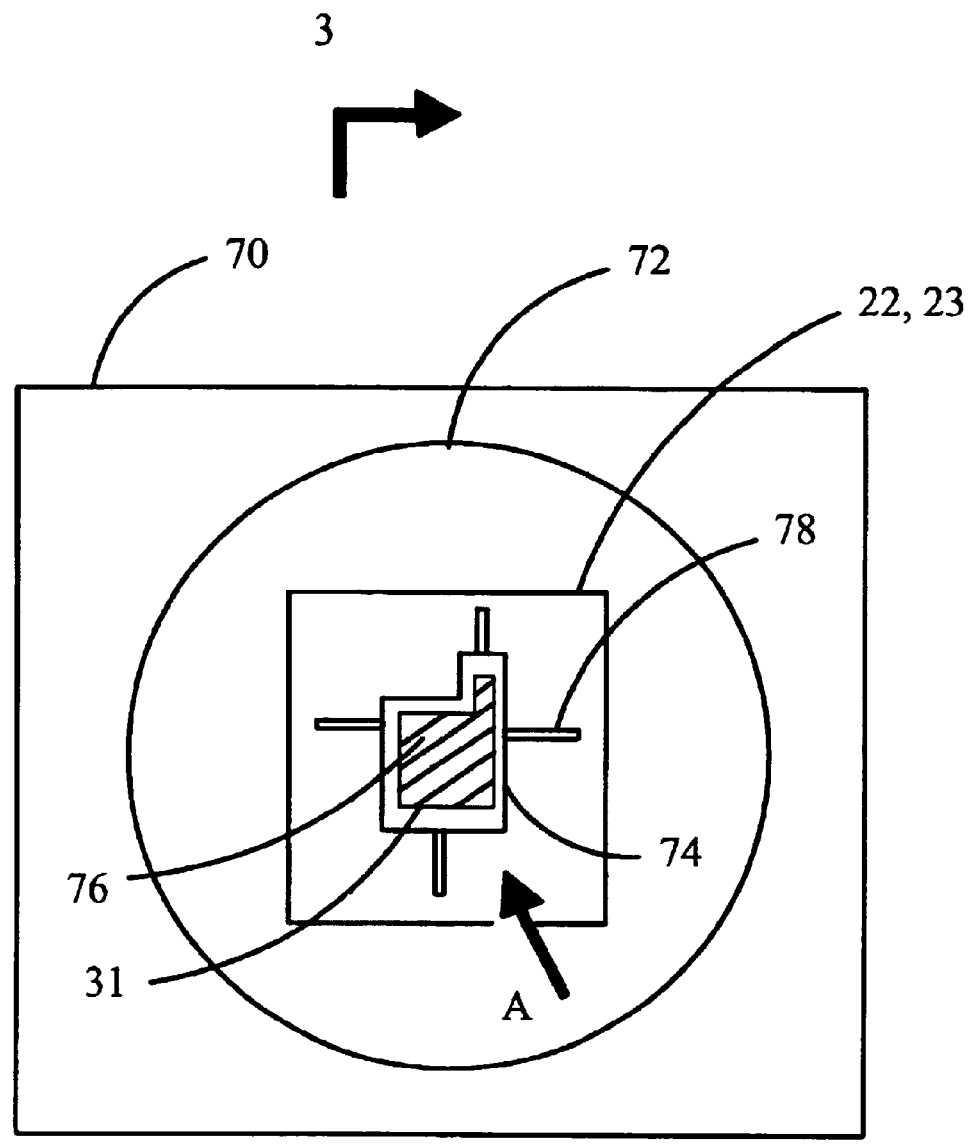
FIG. 2 is a cross-sectional view of a slider feed tube at the attachment piece of the sender track of the present invention with the view taken from reference line 2—2 of FIG. 1.
Figure 3:
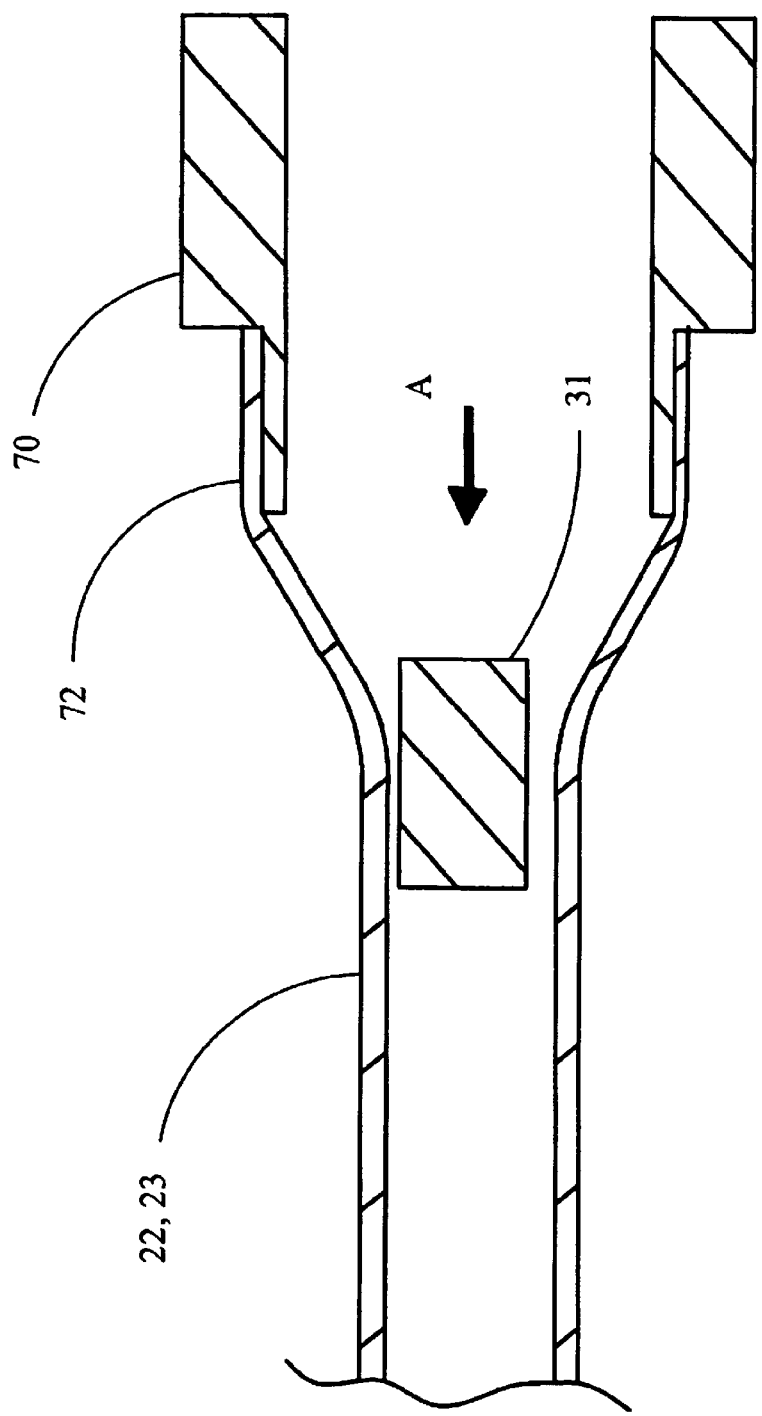
FIG. 3 is an alternate cross-sectional view of the slider feed tube at the attachment piece of the sender track of the present invention with the view taken from reference line 3—3 of FIG. 2.

In the cross-sectional views of FIGS. 2 and 3, the attachment of the first feed tube 22 to an attachment piece 70 of the first sender track 20 is shown. The attachment of the second feed tube 23 to the second sender track 21 has a similar arrangement. In the figures, the first feed tube 22 is press-fit and fastened within the attachment piece 70 to form a bellmouth 72. The expanded opening of the bellmouth 72 allows the sliders 31 launched from the first sender track 20 to position within an interior passage 74. The interior passage 74 is sized to efficiently transport the sliders 31 from the slider exit port 40 to the first loading rack 25 by being shaped to the slider. Also, by being shaped to the slider, the interior passage 74 prevents slider rotation or tumbling during transport of the slider.

During the launching of the sliders in direction "A", the pressurized air from the first sender track 20 acts against a cross-section 76 of each slider 31 as it enters the bellmouth 72. Since the interior passage 74 is slightly larger than the cross-section 76 of the slider 31 but is shaped the same as the slider, the effectiveness of the pressurized air is enhanced and the positioning of the slider is maintained. Relief passages 78 encompass the interior passage 74 to handle over-pressurization of the first feed tube 22 without affecting the movement of the slider 31.

Figure 4:
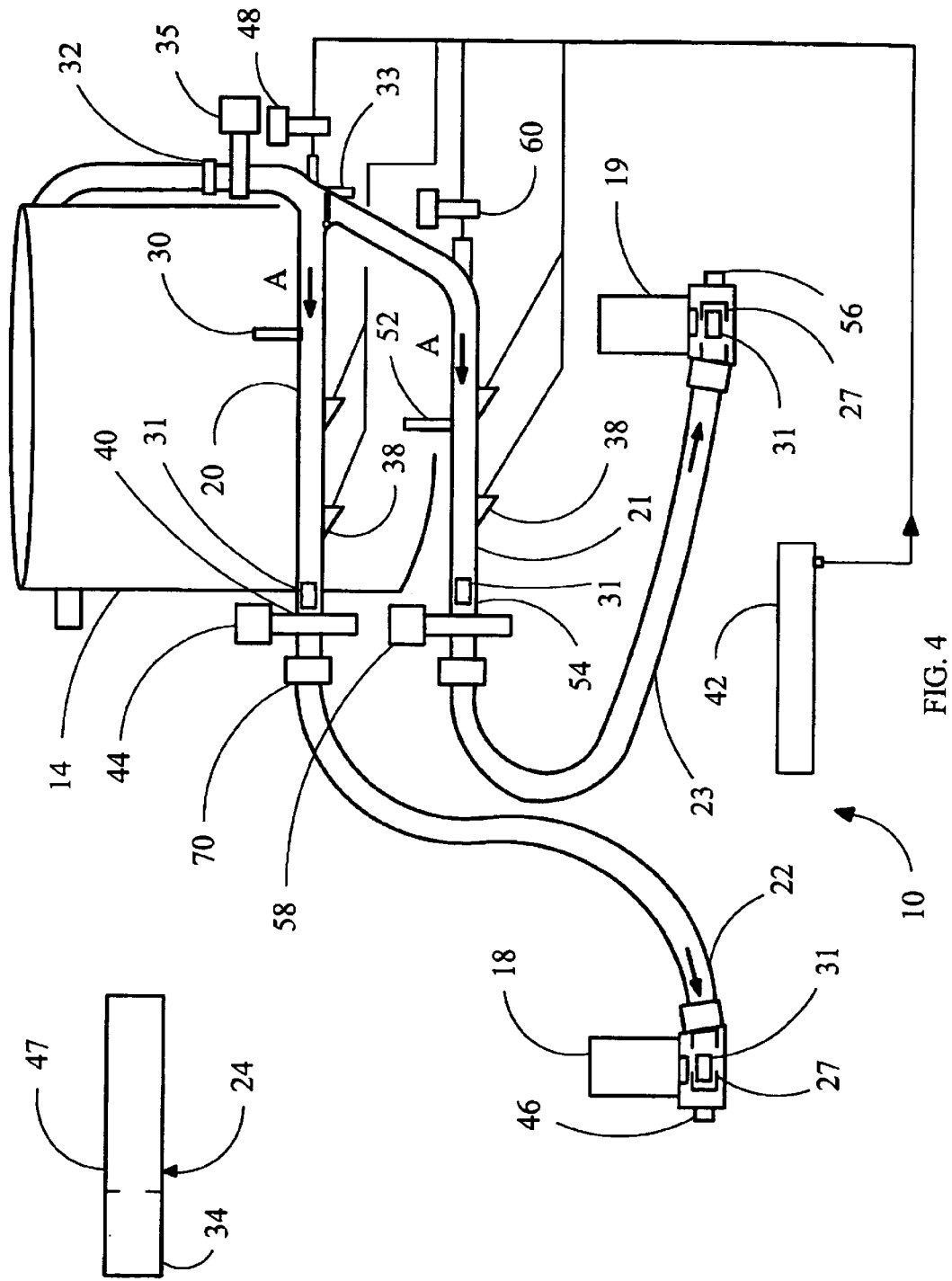
FIG. 4 is an arrangement view of the first embodiment of the present invention with sliders being fed from a supply of sliders directly to the insertion areas of two slider insertion devices.

In some circumstances, such as space considerations, loading racks may not be used with the slider insertion devices 18, 19. In FIG. 4, the feed tubes 22, 23 transport a single slider 31 directly to the slider insertion area 27 of the slider insertion devices 18, 19. In regard to the slider insertion device 18, the second sensor 46 detects the presence of a slider 31 within the slider insertion area 27. If a slider 31 is not present, the second sensor 46 signals the second controller 47 to open the second plunger 44 and the first pneumatic valve 48.

The second plunger 44 opens a passage from the first sender track 20 to the first feed tube 22 while the first pneumatic valve 48 opens to provide an air blast in the sender track which launches the slider 31 in direction "A". The first plunger 35 and the directional gate 33 may be controlled to allow one slider at a time from the vibratory bowl 14 to either the first sender track 20 or to the second sender track 21 if the sliders are not pre-stored in the sender tracks.

Similar to the multi-slider feeding process, the launched slider 31 passes from the first sender track 20 to the first feed tube 22. After passage through the first feed tube 22, the first slider insertion device 18 is supplied with a slider 31 ready for insertion. Once the slider 31 is detected in the slider insertion area 27 of the slider insertion device 18, the second sensor 46 signals the second controller 47 to close the first pneumatic valve 48 and the second plunger 44. This process repeats itself as the sliders 31 are being used during insertion onto a zipper used for a reclosable bag.

The apparatus 10 can alternatively send a slider 31 to the slider insertion area 27 of the second slider insertion device 19 or to additional slider insertion devices. In regard to the second slider insertion device 19, once the fourth sensor 56 detects that a slider is not present in the slider insertion area 27 of the slider insertion device 19, the sensor signals the second controller 47 to open the third plunger 58 and the second pneumatic valve 60. The third plunger 58 opens a passage from the second sender track 21 to the second feed tube 23 while the second pneumatic valve 60 opens to provide an air blast into the sender track. The air blast launches the slider 31 out of the second sender track 21 into and through the second feed tube 23.

After passage through the second feed tube 23, the second slider insertion device 19 is supplied with a slider 31 ready for insertion. Once the slider 31 is detected in the slider insertion area 27, the fourth sensor 56 signals the second controller 47 to close the second pneumatic valve 60 and the third plunger 58. The slider feeding process repeats itself on the second sender track 21, and/or the slider feeding process on the second sender track alternates with the slider feeding process on the first sender track 20, as the sliders 31 are being used during insertion onto a zipper used for a reclosable bag.

Figure 5:
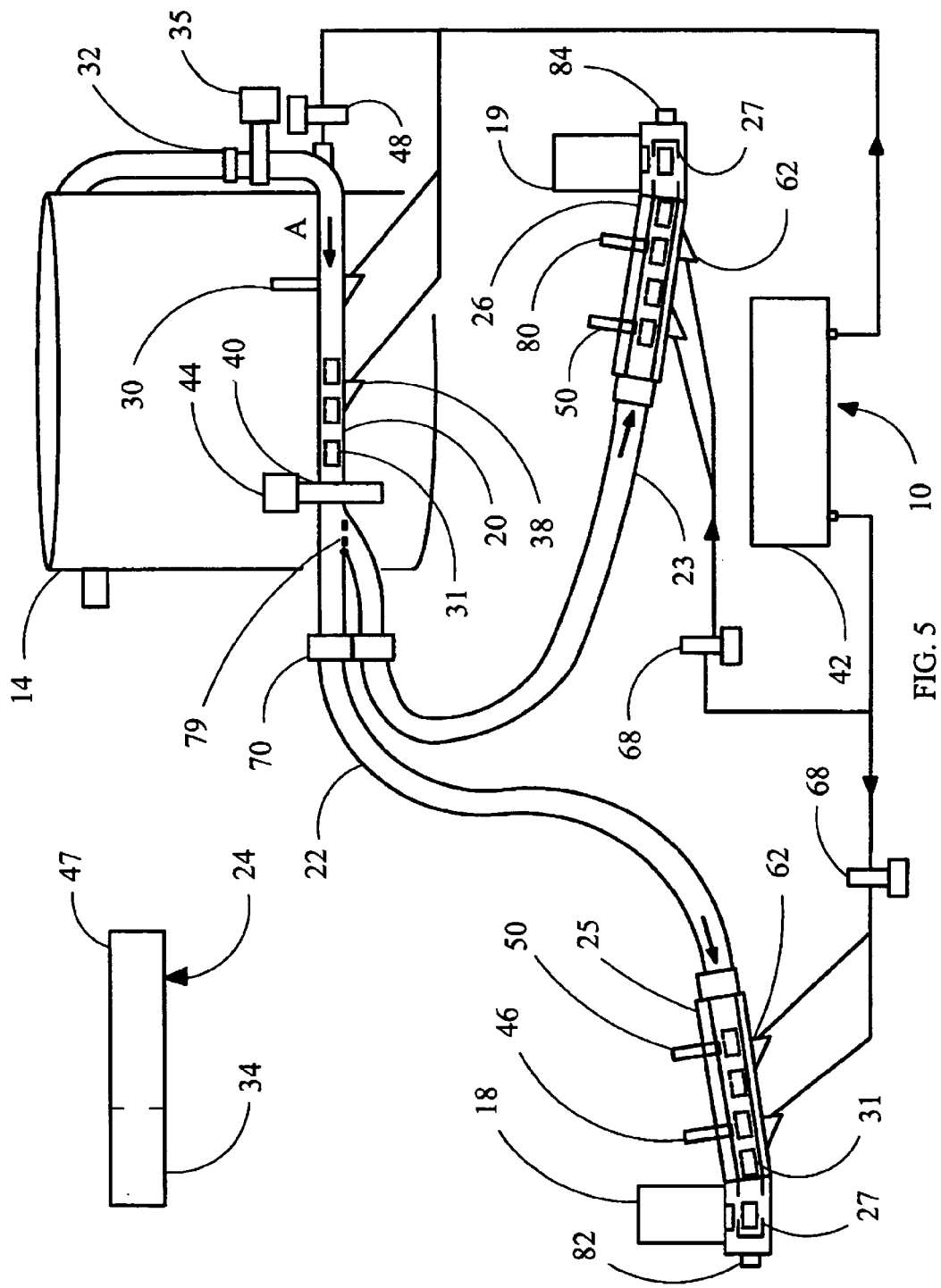
FIG. 5 is an arrangement view of a second embodiment of the present invention with sliders being fed from a supply of sliders to the loading racks of two slider insertion devices.

In the slider feeding process of the second embodiment, shown in FIG. 5, the first sensor 30 on the first sender track 20 detects the quantity of, or a lack of, sliders 31 in the sender track. The first sensor 30 signals the control panel 24 to actuate the vibratory bowl 14 to release a quantity of sliders 31 from a supply of sliders to the slider entry port 32. Once the first sensor 30 detects that the first sender track 20 has a predetermined quantity or an adequate quantity of sliders 31, the control panel 24 turns off the vibratory bowl 14. Additionally or alternatively, the first controller 34 of the control panel 24 actuates the first plunger 35 to allow movement of the sliders 31 from the vibratory bowl 14 to the first sender track 20. During the off mode of the vibratory bowl 14, the first plunger 35 prevents movement of the sliders 31 to the vibratory bowl by blocking passage to the first sender track 20. The quantity of sliders 31 released to the first sender track 20 is pushed along the sender track by the directional air connections 38 to the second plunger 44 at the slider exit port 40. Once the sliders 31 are sent to the second plunger 44, they are ready to be launched into either feed tube 22 or 23.

When a lack of sliders 31 or a variation in the required quantity of sliders is detected by the second sensor 46, the sensor signals the second controller 47 to actuate a directional gate 79, the second plunger 44 and the first pneumatic valve 48. Upon actuation, the directional gate 79 blocks passage to the second feed tube 23, thereby allowing passage of sliders to the first feed tube 22. The second plunger 44 then opens a passage from the first sender track 20. At the same moment, the first pneumatic valve 48 opens to provide an air blast in the first sender track 20 which launches the sliders 31 out of the sender track in direction "A". The first plunger 35 prevents the launched sliders 31 from being pushed back into the vibratory bowl 14 by closing passage to the vibratory bowl when the first pneumatic valve 48 is opened.

After passage through the first feed tube 22, the first loading rack 25 is supplied with a sufficient quantity of sliders 31. Once a sufficient quantity of sliders 31 is detected in the first loading rack 25, the second sensor 46 signals the second controller 47 to close the first pneumatic valve 48 and the second plunger 44. Backup sensor 50 is provided to signal the second controller 47 when more sliders 31 are needed in either loading rack 25, 26.

The apparatus 10 of the second embodiment can alternatively send a supply of sliders 31 to the second feed tube 23 and the second slider loading rack 26. A sensor 80, connected to the second loading rack 26, is provided to detect a lack of sliders 31 in the loading rack or variations in the quantity of sliders required in the loading rack. When a lack of sliders 31 or a variation in the required quantity of sliders is detected, the sensor 80 signals the second controller 47 to actuate the directional gate 79, the second plunger 44 and the first pneumatic valve 48. Upon actuation, the directional gate 79 blocks passage to the first feed tube 22, thereby allowing passage of sliders to the second feed tube 23. The second plunger 44 then opens a passage from the first sender track 20. At the same moment, the first pneumatic valve 48 opens to provide an air blast in the first sender track 20 which launches the sliders 31 out of the sender track and through the second feed tube 23 in direction "A".

After passage through the second feed tube 23, the second loading rack 26 is supplied with a sufficient quantity of sliders 31. Once a sufficient quantity of sliders 31 is detected in the second loading rack 26, the sensor 80 signals the second controller 47 to close the first pneumatic valve 48 and the second plunger 44. This process repeats itself as the sliders 31 are being used during insertion onto a zipper for a reclosable bag, with the controllers of the control panel 24 being able to direct sliders to either loading rack 25, 26 or to multiple loading racks during the operation of the apparatus 10.

A sensor 82 is provided to detect the presence of a slider 31 in the slider insertion area 27 of the first slider insertion device 18. Another sensor 84 is provided to detect the presence of a slider 31 in the slider insertion area 27 of the second slider insertion device 19. If either of the sensors 82, 84 detects the absence of a slider in the slider insertion area 27 of its respective slider insertion device, the sensor signals the pneumatic valve 68 to release pressurized air into the loading rack at the air connections 62 of the respective slider insertion device, thereby moving the slider 31 to the insertion area of the device.

Figure 6:
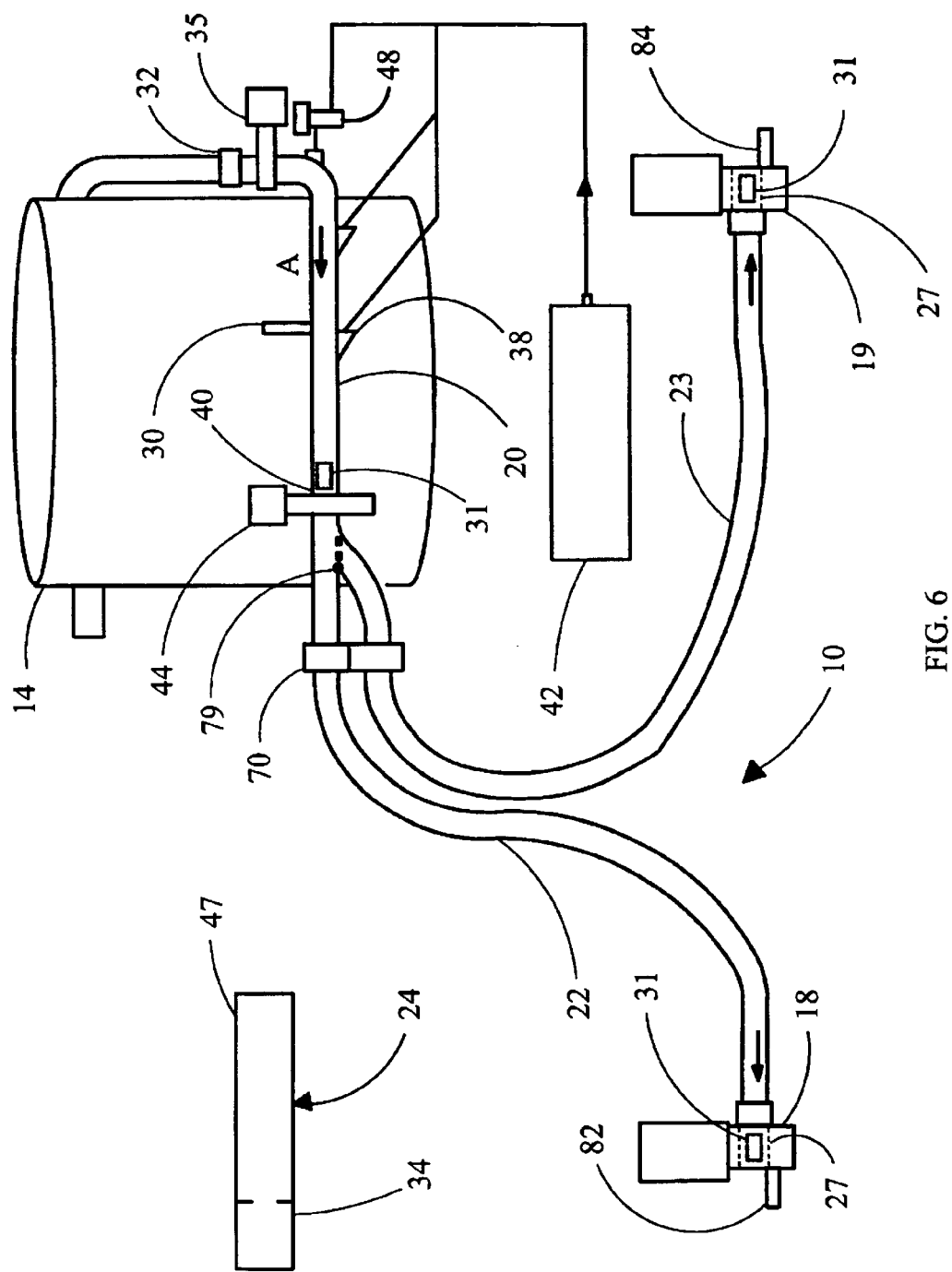
FIG. 6 is an arrangement view of the second embodiment of the present invention with sliders being fed from a supply of sliders directly to the insertion areas of two slider insertion devices.

Similar to the first embodiment of the present invention, the feed tubes 22, 23 can transport a single slider 31 directly to the slider insertion area 27 of the slider insertion devices 18, 19. As shown in FIG. 6, the sensor 82 of the first slider insertion device 18 detects the presence of a slider 31 within the slider insertion area 27 of the device. If a slider is not present, the sensor 82 signals the second controller 47 to actuate the directional gate 79, the second plunger 44 and the first pneumatic valve 48. Upon actuation, the directional gate 79 blocks passage to the second feed tube 23, thereby providing passage to the first feed tube 22. The second plunger 44 then opens a passage from the first sender track 20. At the same moment, the first pneumatic valve 48 opens to provide an air blast in the first sender track 20 which launches the slider 31 out of the sender track in direction "A".

Similar to the multi-slider feeding process, the launched slider 31 passes from the first sender track 20 to the first feed tube 22. After passage through the first feed tube 22, the first slider insertion device 18 is supplied with a slider 31 ready for insertion. Once the slider 31 is detected in the slider insertion area 27 of the slider insertion device 18, the sensor 82 signals the second controller 47 to close the first pneumatic valve 48 and the second plunger 44. This process repeats itself as the sliders 31 are being used during insertion onto a zipper used for a reclosable bag.

The apparatus 10 can alternatively send a slider 31 to the slider insertion area 27 of the second slider insertion device 19. Once the sensor 84 detects that a slider is not present in the slider insertion area 27 of the slider insertion device 19, the sensor signals the second controller 47 to actuate the directional gate 79, the second plunger 44 and the first pneumatic valve 48. Upon actuation, the directional gate 79 blocks passage to the first feed tube 22, thereby providing passage to the second feed tube 23. The second plunger 44 then opens a passage from the first sender track 20. At the same moment, the first pneumatic valve 48 opens to provide an air blast in the first sender track 20 which launches the slider 31 out of the sender track in direction "A".

After passage through the second feed tube 23, the second slider insertion device 19 is supplied with a slider 31 ready for insertion. Once the slider 31 is detected in the slider insertion area 27, the sensor 84 signals the second controller 47 to close the pneumatic valve 48 and the second plunger 44.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

We claim:

1. A method of feeding sliders from a supply of sliders to a plurality of areas for inserting sliders onto a zipper, said method comprising the steps of:

identifying a sender track from a plurality of sender tracks, said identification based on a quantity of sliders in said sender track;

releasing the sliders from the supply of sliders to the identified sender track; and feeding the sliders from said sender track to one of the slider insertion areas.

2. The method in accordance with claim 1 wherein the sliders are fed from said identified sender track by a source of pressurized air.

3. The method in accordance with claim 2 wherein said area for inserting sliders onto a zipper is on a slider loading rack, said method comprising the step of controlling the flow of sliders to said area for inserting sliders in response to a quantity of sliders on the slider loading rack.

4. The method in accordance with claim 3, said method comprising the further step of controlling a supply of pressurized air to said loading rack from said source of pressurized air in response to a detected number of sliders at said slider insertion area.

5. The method in accordance with claim 2 comprising the further step of controlling the flow of sliders into said area for inserting sliders onto a zipper in response to a detected number of sliders at said area for inserting sliders onto a zipper.

* * * * *